United States Patent [19]

Boutni

[11] Patent Number: 5,106,907
[45] Date of Patent: Apr. 21, 1992

[54] ENGINEERING THERMOPLASTIC WITH IMPROVED PROCESSABILITY AND PERFORMANCE

[75] Inventor: Omar M. Boutni, Mt. Vernon, Ind.

[73] Assignee: General Electric Company, Mt. Vernon, Ind.

[21] Appl. No.: 550,767

[22] Filed: Jul. 10, 1990

[51] Int. Cl.⁵ .................... C08L 69/00; C08L 67/02; C08L 25/12

[52] U.S. Cl. ...................... 525/67; 525/64; 525/133; 525/146; 525/148

[58] Field of Search .................. 525/64, 67, 133, 146, 525/148

[56] References Cited

U.S. PATENT DOCUMENTS 4,393,161  7/1984  Van Abeelen et al. ............. 524/506
4,503,183  3/1985  Liu ........................ 524/504
4,710,534  12/1987 Liu ........................ 525/67

FOREIGN PATENT DOCUMENTS 105338  4/1984  European Pat. Off. .
3601423  7/1987  Fed. Rep. of Germany ........ 525/67

Primary Examiner—Melvyn I. Marquis
Assistant Examiner—David Buttner
Attorney, Agent, or Firm—Martin Barancik; Joseph Eisele

[57] ABSTRACT

A four-component blend of an aromatic carbonate polymer, a styrene-acrylonitrile copolymer, a methacrylate-diene-styrene shell-core copolymer and polybutylene terephthalate exhibits good shear thinning characteristics and weldline strength, as well as other favorable mechanical properties.

7 Claims, No Drawings

ENGINEERING THERMOPLASTIC WITH IMPROVED PROCESSABILITY AND PERFORMANCE

BACKGROUND OF THE INVENTION

1. Field of the Invention

The invention is directed to thermoplastic blends of aromatic carbonate polymers, polybutylene terephthalate, styrene-acrylonitrile copolymer, and a methacrylate-butadiene-styrene shell-core copolmer.

2. Brief Description of the Prior Art

Aromatic carbonate polymers, such as polycarbonates, have become major commercial thermoplastics in view of their excellent physical properties. Furthermore, the physical properties can sometimes be improved by blending with other thermoplastics, although the choice of the type of additive thermoplastic and the amount is often quite critical.

For example, impact strength of carbonate polymers can be improved by blending with appropriate quantities of selected impact modifiers, such as core-shell copolymers of acrylonitrile-styrene copolymerized and grafted onto a core of butadiene-styrene elastomer or onto a core of an acrylic elastomer; see for example Liu, U.S. Pat. No. 4,503,183 (General Electric Co., 1985).

Another property of polycarbonates which can be improved by blending with additives is processability. For example, blends of polycarbonates with styrene-acrylonitrile copolymers have significantly improved flow properties, even when fiber-reinforced as taught by Van Abeleen in U.S. Pat. No. 4,393,161 (General Electric Co., 1983).

Useful blends of carbonate polymers with polybutylene terephthalate are also well known and commercially available. For example, General Electric's resin blend is marketed under the Trademark XENOY ®. The main properties imparted to a base resin of polycarbonate imparted by the polybutylene terephthalate added to the polycarbonate are solvent resistance, environmental stress failure resistance, and lower melt flow viscosity. Such blends of carbonate polymers with polybutylene terephthalate can also be further improved by making three-component blends with various impact modifiers added such as methacrylate-butadiene-styrene and like shell-core copolymers (General Electric Co., Eur. Pat. Appl. 105,388[1982]).

However, despite the many useful carbonate resin blends that have been found, many troublesome constraints, limitations, and pitfalls are found in the blending of carbonate polymers. With few exceptions, most high molecular weight polymers do not form true solutions (single phase mixtures) with one another. The improved properties of most blends are instead associated with the formation of microdomains or phases of differing polymer content. The physical separation of the blend components to form such phases frequently leads to delamination and weak weldlines in objects molded from the polymer blends. Weldlines, also known as "knit lines" are the surfaces of juncture between the flows coming into the mold cavity from different gates; it is important that such weldlines should not constitute weak places in molded articles made by use of multigate (such as double gate) molds.

Another problem encountered with many otherwise useful carbonate polymer blends is poor flow properties during molding. To facilitate molding, the rheology of the polymer blend should exhibit the desirable property of shear thinning, i.e. reduction of viscosity with increased rate of shear. Shear thinning permits faster molding cycles at a given molding temperature; or, at a given temperature, shear thinning permits complete filling of the mold with lower pressure requirements.

A further problem encountered with carbonate polymer blends has been a tendency towards excess embrittlement (decline in impact strength) at low temperatures.

All three requirements, namely the requirement for strong weld lines, the requirement for shear thinning properties, and the requirement for good low temperature properties, are especially important for large molded articles such as automotive instrument panels. All three requirements have hitherto been difficult to simultaneously satisfy in polycarbonate blends containing styrene-acrylonitrile (SAN) impact modifiers, in polycarbonate-polybutylene terephthalate blends, or in polycarbonate-polybutylene terephthalate-impact modified blends. It is commonly found that as one property is improved, one or both of the other desired properties suffers, and the compromise may be generally unsatisfactory.

I have now found, that articles molded from certain four-component blends of carbonate polymer base resins have, simultaneously, good high and low temperature impact, good shear thinning properties, and strong weldlines. Such blends are achieved by using critical amounts of four blending components.

SUMMARY OF THE INVENTION

The compositions of the invention comprise blends of:

(a) an aromatic carbonate polymer (preferably a polycarbonate);

(b) shear rate depending viscosity improving effective amount of a styrene-acrylonitrile copolymer;

(c) an impact-improving effective amount of an alkacrylate-(conjugated)diene-styrenic comonomer shell-core copolymer impact modifier; and (d) a weldline strength-improving effective amount of polybutylene terephthalate.

Effective quantities are from about 2% to about 15% (preferably from about 4% to about 10%) of the styrene-acrylonitrile copolymer (b), from about 2% to about 20% (preferably from about 3% to about 12%) of the core-shell polymer (c) and from about 2% to about 50% (preferably from about 4% to about 15%) of the polybutylene terephthalate (d), the remainder of the four-component thermoplastic blend being essentially the aromatic carbonate (a). All percentages stated herein are by weight relative to the sum of (a), (b), (c) and (d), not taking into account fillers and other adjuvants.

DETAILED DESCRIPTION OF THE PREFERRED EMBODIMENTS OF THE INVENTION

The aromatic carbonate polymers useful as component (a) of the above-described blends of the invention include polycarbonates as well as polyester-carbonates. The method of preparation of polycarbonates by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the suitable processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgenation reaction proceeds may vary from below 0° C., to above 100° C. The phosgenation reaction typically proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

The dihydric phenols employed are known, and the reactive groups are the two phenolic hydroxyl groups. Some of the dihydric phenols are represented by the general formula:

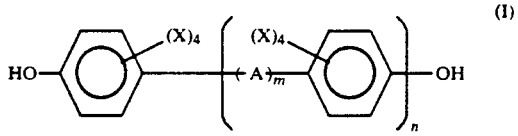

(I)

wherein A is a divalent hydrocarbon radical containing from 1 to about 15 carbon atoms; a substituted divalent hydrocarbon radical containing from 1 to about 15 carbon atoms and substituent groups such as halogen; —S—; —S—S—; —S(=O)—; —S(=O)$_2$—; —O—; or —C(=O)—; wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

Typical of some of the dihydric phenols that can be employed in the practice of the present invention are bis-phenols such as (4-hydroxyphenyl)methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'- dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, trimellitic anhydride, trimellitic acid, trimellitoyl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. Particularly suitable polyfunctional aromatic compounds are 1,1,1-tri(4-hydroxyphenyl)ethane, trimellitic anhydride or trimellitic acid or their haloformyl derivatives. Also included herein are blends of a linear polycarbonate and a branched polycarbonate.

The aromatic carbonate polymers suitable for use as component (a) of the compositions of the invention include polyester-carbonates, also known as copolyester-polycarbonates, i.e., resins which contain, in addition to recurring polycarbonate chain units of the formula:

(IIa)

wherein D is a divalent aromatic radical of the dihydric phenol employed in the polymerization reaction, repeating or recurring carboxylate units, for example of the formula:

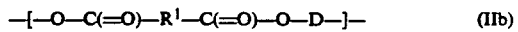

(IIb)

wherein D is as defined above and R$^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the copolyester-carbonate resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

$$HOOC-R^1-COOH \qquad (III)$$

wherein $R^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

$$-E-$$

wherein E is a divalent alkylene or alkylidene group. E may also consist of two or more alkylene or alkylidene groups, connected by a non-alkylene or alkylidene group, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are suitable. Thus, in such aromatic difunctional carboxylic acids, $R^1$ is an aromatic radical such as phenylene, biphenylene, naphthylene, or substituted phenylene. Some non-limiting examples of suitable aromatic dicarboxylic acids which may be used in preparing the poly(estercarbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; an organic group such as alkyl; or an oxy group such as alkoxy, it being only necessary that Y be inert to and unaffected by the reactants and the reaction conditions.

Particularly useful aromatic dicarboxylic, acids are those represented by the general formula:

(IV)

wherein j is a positive whole integer having a value of from 0 to 4 inclusive; and each $R^3$ is independently selected from the group consisting of alkyl radicals, preferably lower alkyl (1 to about 6 carbon atoms).

Mixtures of these dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes most convenient, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The preferred polycarbonates for use in the present invention are those derived from bisphenol A and phosgene and having an intrinsic viscosity of about 0.3 to about 1.5 deciliters per gram in methylene chloride at 25.

In regard to component (b), of the compositions of the invention, the styrene-acrylonitrile (SAN) copolymer, they are well-known copolymers which can be prepared by copolymerization of from about 68% to about 80% (preferably from about 70% to about 78%) styrene and from about 20% to about 32% (preferably from about 22% to about 30%) of acrylonitrile. The molecular weight of SAN can be varied within a wide range, typically from about 30,000 to about 600,000, but this is not critical. SAN is readily produced by known processes such as mass, solution, suspension, or emulsion polymerization. While the use of minor amounts of other comonomers is not excluded, the present invention is not intended to encompass the use of acrylonitrile-butadrene-styrene copolymer (ABS) as component (b) even though SAN is often a component of ABS, i.e. the blends of the present invention are characterized by the presence of SAN but the essential absence of ABS.

ABS has a rubber component (butadiene) which is present to impart impact properties, which in my present invention are imparted by the component (c) hereinafter described in detail. By thus avoiding presence of ABS, substantially better weathering properties are achieved amongst other advantages.

In the broader scope of the invention, the SAN component can be present in a proportion up to about 15%, at which level it provides good processing properties, notably shear thinning. However, at this level its tendency to reduce weldline strength may require the addition of polybutylene terephthalate (PBT) at proportions toward the high end of the broader stated PBT range described above, to reach a desired weldline strength. By limiting the SAN to the preferred range described above, not exceeding about 10 %, the formulation does not need as much PBT to achieve good weldline strength and under this circumstance, PBT in its preferred range can be used to achieve good weldline strength.

The impact modifier component (c) described about and employed in the composition of the invention is an alkacrylate-(conjugated)dienestyrenic comonomer core/shell copolymer comprising a conjugated diene with a T less than or equal to $-10°$ C. as the core. The conjugated diene which can be employed as the core includes polymerized butadiene or isoprene, preferably butadiene. The core is from about 50-90 percent of the core/shell polymer, preferably about 55-80 percent (by weight). The core portion of the polymer need not be comprised solely of the polymerized diolefin; however, at least 50 wt. percent of the core is advantageusly the polymerized diolefin, e.g. butadiene. Other polymerized monomers which may be present in the core include styrene, butyl acrylate, and other acrylate monomers. The shell material is comprised of a copolymer of an alkyl alkacrylate and a styrenic comonomer. Examples of an alkyl alkacrylate include methyl methacrylate, ethyl methacrylate, butyl methacrylate, and the like. Methyl methacrylate is preferred. Examples of a styrenic comonomer include styrene, alpha-methylstyrene, alpha-ethylstyrene, o, m or p-butyl styrene, o-methylstyrene, p-methylstyrene, p-propylstyrene, 1-vinylnaphthalene, and the like. Styrene itself is preferred. Other polymerized monomers which may be present in the shell include acrylates such as methyl or ethyl acrylates. Polymerized methyl methacrylates, with or without styrene as comonomer, are the preferred shell materials. The shell accounts for about 10-50 percent of the core/shell polymer, preferably about 5-25 percent by weight of each of the methyl methacrylate and, optionally, styrene. Crosslinking and grafting agents may also be present in the core and/or shell. Examples of such agents include 1,3-butylene glycol dimethacrylate, allyl acrylate, (meth)acrylic acid vinyl esters, triallyl cyanurate, divinylbenzene, and the like. Acrylonitrile and/or methacrylonitrile are not present in the shell phase of the shell/core polymer employed in this invention.

Specific commercially available polymers which can be used as component (c) in accordance with the invention include KM653 and like products available from Rohm and Haas Chemical Co. KM653 is an MBS (methacrylate-butadiene-styrene polymer) with about 70-73 wt. percent butadiene in the core, 12 wt. percent methyl methacrylate, and 15 wt. percent styrene. There is a sufficient amount of crosslinker to give at least 96.9 percent insolubles in acetone. Kane Ace ® B-56, available from Kaneka America or Kanegafuchi, is an MBS with about 66 wt. percent butadiene, 20 wt. percent methyl methacrylate, and 14 wt. percent styrene, and a sufficient amount of crosslinker to give at least 92 percent insolubles in acetone. Other MBS polymers include the Metablen ® C Series of impact modifiers (C TM 201, C-202, C-202C and C-223) commercially available from M&T Chemicals Inc., and the Acryloid ® KM and EXL Series of impact modifiers (KM581, KM436, KM680, EXL2691, EXL2607, and EXL2647) available from Rohm & Haas Chemical Co.

The preferred core/shell polymers overall are methyl methacrylate-butadiene-styrene core/shell polymer. The specifically preferred polymer being Kane Ace ® B-56 as described above.

The core/shell polymer is employed in the compositions of the invention in an effective amount sufficient to bring about high impact strength in the room temperature (RT) $\frac{1}{8}$-inch Notched Izod test, ASTM D-256. The amount of the shell/core polymer will be below about 20% (by weight) and preferably below about 12% since larger amounts generally do not bring about higher impact resistance and can cause undesirable side effects such as incompatibility (as shown by delamination in a molded part). Quantities less than about 2% do not generally bring about sufficiently increased ductility, therefore, above 3% is preferable.

The polybutylene terephthalate (PBT) polymer for use as component (d) in the blended thermoplastics of the invention are well known in the art and are described, for example, by Hepp in U.S. Pat. 4,684,686 (Aug. 1987). It is a polyester obtained by polymerizing a glycol component [at least 70 mole preferably at least 80 mole %, of which consists of tetramethylene glycol (1,4-butanediol or 1,4-butylene glycol)] and an acid component (at least 70 mole %, preferably at least 80 mole %, of which consists of terephthalic acid, or polyester-forming derivatives thereof).

The PBT glycol component may contain not more than 30 mole %, preferably not more than 20 mole %, of another glycol, such as ethylene glycol, trimethylene glycol, 2-methyl-1,3-propanediol, hexamethylene glycol, decamethylene glycol, cyclohexanedimethanol, neopentylene glycol or the like.

The PBT acid component may contain not more than 30 mole %, preferably not more than 20 mole %, of another acid such as isophthalic acid, 2,6-naphthalenedicarboxylic acid, 2,7-naphthalenedicarboxylic acid, 1,5-naphthalenedicarboxylic acid, 4,4'-diphenoxyethanedicarboxylic acid, 4,4'-diphenyldicarboxylic acid, p-hydroxybenzoic acid, sebacic acid, adipic acid, and polyester-forming derivatives thereof. The polybutylene terephthalate used in this invention preferably has an intrinsic viscosity [n] measured in 60/40 by weight phenol/tetrachloroethane at 30° C., of 0.3 to 1.5 dl/g.

The blends of the invention may be modified by the addition of additives known to the art of plastics compounding. Such additives can may include fillers (such as clay or talc), reinforcing agents (such as glass fibers), impact modifiers, other resins, plasticizers, flow promoters and other processing aids, stabilizers, colorants, mold release agents, flame retardants, ultraviolet screening agents, and the like.

The production of the compositions of the invention may be accomplished by blending the components using any of the blending means known for blending of thermoplastics, such as blending in a kneading machine (such as a Banbury mixer, Werner Pfleiderer blender, or in an extruder, or by means of a roll mill). The sequence of addition is not critical but the components should be thoroughly blended together.

The compounded composition of the invention can

The Examples 4–6, inclusive, are not of the invention, but are presented for purposes of comparison. The formulations and results are given in the following table:

| Example No.: | 1 | 2 | 3 | COMPARATIVE 4 | 5 | 6 |
|---|---|---|---|---|---|---|
| Composition (wt. %): | | | | | | |
| LEXAN ® 145[T] | 90 | 85 | 80 | 95 | 90 | 90 |
| PBT (Valox ® 295)[2] | 5 | 5 | 5 | — | — | 10 |
| SAN[3] | 5 | 10 | 15 | 5 | 10 | — |
| MBS (KANE ACE ® B56)[4] | 7 | 7 | 7 | 7 | 7 | 7 |
| Properties: | | | | | | |
| Tensile yield (psi) | 8600 | 8800 | 8900 | 8300 | 8500 | 8600 |
| Tensile yield (MPa) | 59.3 | 60.7 | 61.4 | 57.3 | 58.7 | 59.3 |
| Tensile break (psi) | 9600 | 9600 | 8600 | 9600 | 8700 | 8200 |
| Tensile break (MPa) | 66.2 | 66.2 | 59.3 | 66.2 | 60.0 | 56.5 |
| Elongation at break % | 113 | 119 | 93 | 111 | 93 | 93 |
| Flexural yield (psi) | 13300 | 13500 | 13600 | 12600 | 13000 | 13500 |
| Flexural yield (MPa) | 91.8 | 93.1 | 93.8 | 86.9 | 87.9 | 93.1 |
| Fex. modulus ($10^5$ psi) | 3.4 | 3.5 | 3.6 | 3.2 | 3.3 | 3.2 |
| Fexural modulus (MPa) | 2400 | 2400 | 2500 | 2200 | 2300 | 2200 |
| DTUL °C. @ 264 psi (1.82 MPa) | 232 | 220 | 232 | 249 | 249 | 214 |
| Kasha Index (csec)[5] | 2290 | 1840 | 1970 | 2090 | 2310 | 2180 |
| Weldline strength[6] ft lb | 42.8 | 34.7 | 3.6 | 1.1 | 4.5 | 27.0 |
| Weldline strength[6] (J) | 58.0 | 47.0 | 4.9 | 1.5 | 6.1 | 36.6 |
| ⅛" N. Izod, ft lb/in | | | | | | |
| at room temp. | 13.6 | 13.6 | 13.5 | 13.5 | 13.8 | 12.0 |
| at −30° C. | 12.1 | 8.0 | 4.6 | 11.7 | 7.0 | 8.7 |
| at −40° C. | 10.4 | 7.5 | 5.9 | 12.1 | 6.0 | 7.0 |
| 3.175 mm " ", J/m | | | | | | |
| at room temp. | 726 | 726 | 721 | 721 | 737 | 640 |
| at −30° C. | 646 | 430 | 250 | 625 | 380 | 465 |
| at −40° C. | 555 | 400 | 315 | 646 | 320 | 374 |
| INTRUMENTED IMPACT ON RIBBED DISKS[7]: | | | | | | |
| ft lb at room t. | 20.7 | 22.3 | 19.8 | 20.9 | 21.4 | 21.2 |
| J at room temp. | 28.0 | 30.2 | 26.8 | 28.3 | 29.0 | 29.0 |
| ft lb at −30° | 17.0 | 18.1 | 2.0 | 6.7 | 14.6 | 7.4 |
| J at −30° | 23.0 | 24.4 | 2.7 | 9.1 | 19.9 | 10.0 |

Notes to table
[1]LEXAN ® 145, a polycarbonate manufactured by General Electric Co. from the reaction of bisphenol A and phosgene.
[2]VALOX ® 295 a polybutylene terephthalate manufactured by General Electric Co.
[3]SAN used in this experiment was BLENDEX ® 570, a copolymer of 72% styrene and 28% acrylonitrile, made by General Electric Co.
[4]KANE ACE ® B56 a core-shell copolymer of about 66% butadiene, 20% methyl methacrylante, about 14% styrene, and a sufficient amount of crosslinker to give at least 92% insolubles in acetone. It is made by Kanegafuchi (Japan).
[5]Kasha Index is a test for melt viscosity described in more detail in U. S. Pat. No. 4,735,978, column 5, this patent being incorporated herein by reference. Kasha Index is reported in centisceonds.
[6]A test for weldline strength run in accordanccordance with the test method of ASTM D256.
[7]A test for weldline strength, run in accordance with ASTM D3763, using 10-cm disks, 3.2 mm thick, with a central rib of 4.3 cm length raised by 3.2 mm.

be extruded and cut up, if so desired, into granules, pellets, and the like by standard techniques. The further processing of the compounded compositions can be carried out by conventional molding or extrusion processes well known in the art.

The invention will be better understood with reference to the following examples, which are presented for purposes of illustration rather than for limitation, and which set forth the best mode contemplated for carrying out the invention.

EXAMPLES 1 to 6

Molding compositions were made by blending the ingredients shown in the table below in a twin screw extruder at 220°–270° C. and 100–200 rpm. The blended and extruded material was then pelletized, dried and injection molded at about 240° C. to prepare test specimens. Physical properties were measured on injection molded samples using the following ASTM test methods: Tensile properties, D638; impact by notched Izod, D256 heat deflection temperature, D648-56, and other tests as described in the footnotes to the data table.

The data show the beneficial effect of the PBT component in regard to weldline strength, particularly below 15% SAN, and particularly at low temperatures. Formulations of the Examples 1 and 2 are satisfactory on the basis of both processability and weldline strength at room temperature (RT) and at low temperatures. Both have good low temperature impact strength. Formulation of the Example 3, which is at the limit of the broad scope of the SAN range, shows a deleterious effect on weldline strength because of the high SAN content, although this is correctable by raising the PBT level. Formulations of the Examples 4 and 5, which are outside the invention by virtue of not containing PBT, show good processability but have unsatisfactory weld line strength. Formulation of the Example 6, which is outside the invention by virtue of not containing SAN, has reasonably good weldline strength but is hard to process.

The following data show the effect of adding SAN on the viscosity and shear thinning of blends of polycarbonate, PBT and MBS. Two of the previous examples (3 and 6) as well as the new invention formulation of Example 7 were tested for viscosity as a function of shear rate. These tests were run using a Gottfert Rheograph 2001 at a temperature of 280° C. using a 30:1 mm die.

The results are shown in the following table:

| Example No.: | *6 | 3 | 7 |
|---|---|---|---|
| Composition (wt. %): | | | |
| LEXAN ® 145[1] | 90 | 80 | 85 |
| PBT (Valox ® 295)[2] | 10 | 5 | 10 |
| SAN[3] | — | 15 | 5 |
| MBS (KANE ACE ® B56)[4] | 7 | 7 | 7 |
| Viscosity (Pa-sec) as function of shear rate (sec$^{-1}$) | | | |
| Shear rate | | | |
| 100 | 461 | 472 | 517 |
| 500 | 358 | 280 | 355 |
| 1000 | 288 | 203 | 272 |
| 5000 | 115 | 75 | 107 |

Footnotes: as in previous table.
*Comparative

Comparing Example 3 of the invention and which contains SAN to comparative Example 6 which lacks SAN, there is observed an increasingly favorable reduction in viscosity as shear rate increases. Comparison of Example 6 to Example 3 shows the useful shear thinning effect of additional SAN.

What is claimed is:

1. A thermoplastic blend, which comprises:
   (a) from about 63 to about 89 percent by weight of an aromatic polycarbonate;
   (b) a shear rate depending viscosity improving effective amount within the range of from about 4 to about 10 percent by weight of a copolymer consisting essentially of a styrene-acrylonitrile copolymer;
   (c) an image-improving effective amount within the range of from about 3 to about 12 percent by weight of an alkacrylate-(conjugated) diene-styrenic comonomer shell-core copolymer impact-modifier; and
   (d) a weldline-improving effective amount within the range of from about 4 to about 15 percent by weight of polybutylene terephthalate;
   all proportions stated being by weight percentage relative to the sum of (a), (b), (c) and (d), exclusive of fillers and adjuvants.

2. A thermoplastic blend of claim 1 substantially free of acrylonitrile-butadiene-styrene copolymers.

3. A thermoplastic blend of claim 1 wherein said polybutylene terephthalate has an intrinsic viscosity of about 0.3 to 1.5 deciliters per gram measured in 60/40 by weight phenol/tetrachloroethane at 30° C.

4. A thermoplastic blend of claim 1 in which (a) is a polycarbonate derived from bisphenol A and phosgene.

5. A thermoplastic blend of claim 4 wherein said polycarbonate has an intrinsic viscosity of about 0.3 to 1.5 deciliters per gram measured in methylene chloride at 25° C.

6. A thermoplastic blend of claim 1 wherein said styrene-acrylonitrile copolymer is a copolymer of from about 70% to about 78% styrene and from about 22% to about 30% acrylonitrile.

7. A thermoplastic blend of claim 1 wherein said shell-core copolymer (c) is a methyl methacrylate-styrene-butadiene shell-core copolymer.

* * * * *